United States Patent
Fan

(10) Patent No.: US 10,614,291 B2
(45) Date of Patent: Apr. 7, 2020

(54) LIVING BODY DETECTION METHOD, LIVING BODY DETECTION SYSTEM AND COMPUTER PROGRAM PRODUCT

(71) Applicants: BEIJING KUANGSHI TECHNOLOGY CO., LTD., Beijing (CN); MEGVII (BEIJING) TECHNOLOGY CO., LTD., Beijing (CN)

(72) Inventor: Haoqiang Fan, Beijing (CN)

(73) Assignees: BEIJING KUANGSHI TECHNOLOGY CO., LTD., Beijing (CN); MEGVII (BEIJING)TECHNOLOGY CO., LTD., Beijing (CN)

( * ) Notice: Subject to any disclaimer, the term of this patent is extended or adjusted under 35 U.S.C. 154(b) by 25 days.

(21) Appl. No.: 15/580,210

(22) PCT Filed: Jun. 8, 2015

(86) PCT No.: PCT/CN2015/080963
§ 371 (c)(1),
(2) Date: Dec. 6, 2017

(87) PCT Pub. No.: WO2016/197297
PCT Pub. Date: Dec. 15, 2016

(65) Prior Publication Data
US 2018/0165512 A1   Jun. 14, 2018

(51) Int. Cl.
*G06K 9/00* (2006.01)
*G06K 9/20* (2006.01)

(52) U.S. Cl.
CPC ..... *G06K 9/00255* (2013.01); *G06K 9/00906* (2013.01); *G06K 9/2018* (2013.01); *G06K 9/2027* (2013.01); *G06K 9/2036* (2013.01)

(58) Field of Classification Search
CPC .......... G06K 9/00255; G06K 9/00906; G06K 9/2018; G06K 9/2027; G06K 9/2036
See application file for complete search history.

(56) References Cited

U.S. PATENT DOCUMENTS 5,077,803 A * 12/1991 Kato .................... A61B 5/1172
356/71
6,201,886 B1 * 3/2001 Nakayama ......... G06K 9/00006
382/124

(Continued)

FOREIGN PATENT DOCUMENTS

CN       1404002       3/2003
CN       1426760       7/2003

(Continued)

OTHER PUBLICATIONS

Google Scholar search results.*

(Continued)

*Primary Examiner* — Qun Shen
(74) *Attorney, Agent, or Firm* — Hamre, Schumann, Mueller & Larson, P.C.

(57) ABSTRACT

The present invention relates to a living body detection method, a living body detection system and a computer program product, which can realize living human body detection. The living body detection method includes: using a laser light source to irradiate the face of an object to be detected; capturing an image of the face of the object to be detected that is irradiated by the laser light source; calculating a light spot area of the image of the face of the object to be detected; and comparing the light spot area with a first predetermined area threshold value, and if the light spot area is greater than the first predetermined area threshold value, determining that the object to be detected is a living body.

19 Claims, 9 Drawing Sheets

(56) References Cited

U.S. PATENT DOCUMENTS

| | | |
|---|---|---|
| 9,291,450 B2 * | 3/2016 | Takahashi .............. G01B 11/24 |
| 10,372,191 B2 * | 8/2019 | Valko .................... G06F 1/3231 |
| 2003/0044051 A1 | 3/2003 | Fujeda et al. |
| 2006/0067591 A1 * | 3/2006 | Guzzwell ........... G06K 9/00228 |
| | | 382/289 |
| 2007/0183658 A1 * | 8/2007 | Kobayashi ......... G06K 9/00228 |
| | | 382/162 |
| 2008/0037001 A1 | 2/2008 | Yokoyama et al. |
| 2009/0196475 A1 * | 8/2009 | Demirli ................ A61B 5/441 |
| | | 382/128 |
| 2011/0037875 A1 * | 2/2011 | Yamakoshi ........ G02B 21/0096 |
| | | 348/229.1 |
| 2013/0027184 A1 * | 1/2013 | Endoh ................ G06K 9/00013 |
| | | 340/5.83 |
| 2013/0235477 A1 * | 9/2013 | Furukawa .............. G01B 11/24 |
| | | 359/718 |
| 2014/0185764 A1 * | 7/2014 | Takenaka ................ A61B 6/42 |
| | | 378/62 |
| 2014/0301616 A1 | 10/2014 | Picard et al. |
| 2015/0063651 A1 * | 3/2015 | Ishihara .................. G06K 9/48 |
| | | 382/110 |
| 2015/0189194 A1 * | 7/2015 | Tajima .................. A61B 6/488 |
| | | 378/62 |
| 2016/0261793 A1 * | 9/2016 | Sivan .................. H04N 19/597 |
| 2017/0119298 A1 * | 5/2017 | Cheung .................. G06F 3/013 |

FOREIGN PATENT DOCUMENTS

| | | |
|---|---|---|
| CN | 101120879 | 2/2008 |
| CN | 101226589 | 7/2008 |
| CN | 102129558 | 7/2011 |
| CN | 103890778 | 6/2014 |
| WO | 2001/01329 | 1/2001 |

OTHER PUBLICATIONS

First Chinese Office Action, issued in the corresponding Chinese application No. 201580000335.6, dated Jul. 20, 2018, 15 pages.

International Search Report, issued in the corresponding PCT application No. PCT/CN2015/080963, dated Mar. 15, 2016, 4 pages.

Second Chinese Office Action, issued in the corresponding Chinese application No. 201580000335.6, dated May 8, 2019, 9 pages, and corresponding English translation.

Zou et al., "New Progress in Mathematics and Its Applications", 2010.

Yao, "Digital Image Processing and Application in Engineering" 2011.

* cited by examiner

LIVING BODY DETECTION METHOD, LIVING BODY DETECTION SYSTEM AND COMPUTER PROGRAM PRODUCT

TECHNICAL FIELD

The present disclosure relates to the field of living body detection, and more particularly, to a living body detection method, a living body detection system, and a computer program product, which are capable of implementing living body detection on a human body.

BACKGROUND

At present, face recognition systems are more and more applied to scenarios that require an ID authentication in fields like security, finance etc., such as remote bank account opening, access control system, remote transaction operating verification etc. In these application fields with high security level, in addition to ensuring that a face similarity of an authenticatee matches with library data stored in a database, first, it needs that the authenticatee is a legitimate biological living body. That is to say, the face recognition system needs to be able to prevent an attacker from attacking using pictures, 3D face models, or masks and so on.

The method for solving the above problem is usually called living body detection, which aims to determine whether an obtained physiological feature comes from a living, in-field, real person. Living body verification schemes acknowledged as mature do not exist among technology products on market, conventional living body detection techniques either depend on specific hardware devices (such as infrared came, depth camera) or can prevent only simple attacks from static pictures. In addition, most of the living body detection systems existing in the prior art are cooperated-style, i.e., requiring a person being tested to make a corresponding action or stay fixed in place for a period of time according to an instruction from the systems, so it will affect user experience and efficiency of living body detection.

SUMMARY

In view of the above problem, the present disclosure is proposed. The present disclosure provides a living body detection method, a living body detection system, and a computer program product, it is based on the principle that human skin causes subsurface scattering to light so that a larger light spot is generated upon receiving the light, whereas subsurface scattering of photo, screen, mask and the like is very weak comparatively so that only a smaller light spot is formed. A non-cooperated-style living body detection is achieved, a normal user can be effectively distinguished from photo, video, mask attacker, without requiring the user's special cooperation, security and ease-of-use of the living body detection system are increased.

According to an embodiment of the present disclosure, there is provided a living body detection method, comprising: using a laser light source to irradiate a face of an object to be detected; capturing an image of the face of the object to be detected that is irradiated by the laser light source; calculating a light spot area of the image of the face of the object to be detected; and comparing the light spot area with a first predetermined area threshold, and determining that the object to be detected is a living body if the light spot area is greater than the first predetermined area threshold.

In addition, in the living body detection method according to an embodiment of the present disclosure, calculating a light spot area of the image of the face of the object to be detected comprises: acquiring image matrix data of the image of the face of the object to be detected; performing binarization conversion on the image matrix data based on a first predetermined grayscale threshold to convert pixel dots having a grayscale value larger than or equal to the first predetermined grayscale threshold among the image matrix data into pixel dots of a first type having a first grayscale value, and convert pixel dots having a grayscale value smaller than the first predetermined grayscale threshold among the image matrix data into pixel dots of a second type having a second grayscale value, thereby obtaining first binarized image matrix data, the first grayscale value being larger than the second grayscale value; and determining a maximum number of interconnected pixel dots of the first type from among the first binarized image matrix data, and calculating an area corresponding to the maximum number of interconnected pixel dots of the first type as the light spot area.

In addition, in the living body detection method according to an embodiment of the present disclosure, the laser light source is a light source that generates a dot-shaped light spot, and positions of the laser light source and the object to be detected are relatively fixed.

In addition, in the living body detection method according to an embodiment of the present disclosure, the laser light source is a light source that generates a plurality of dot-shaped light spots, and positions of the laser light source and the object to be detected relatively change, and capturing an image of the face of the object to be detected that is irradiated by the laser light source comprises: capturing an image of the face of the object to be detected that is irradiated by the laser light source, and determining a regional image corresponding to a predetermined region of the object to be detected in said image as an image of the face of the object to be detected.

In addition, in the living body detection method according to an embodiment of the present disclosure, the laser light source is a laser light source capable of adjusting a light emission direction, and positions of the laser light source and the object to be detected relatively change, and acquiring image matrix data of the image of the face of the object to be detected comprises: acquiring preliminary image matrix data of the face of the object to be detected that is irradiated by the laser light source; performing binarization conversion on the preliminary image matrix data based on a first predetermined grayscale threshold to convert pixel dots having a grayscale value larger than or equal to the first predetermined grayscale threshold among the preliminary image matrix data into pixel dots of a first type having a first grayscale value, and convert pixel dots having a grayscale value smaller than the first predetermined grayscale threshold among the preliminary image matrix data into pixel dots of a second type having a second grayscale value, thereby obtaining binarized preliminary image matrix data; determining a maximum number of interconnected pixel dots of the first type from among the binarized preliminary image matrix data, and calculating a first center-of-gravity position corresponding to the maximum number of interconnected pixel dots of the first type; determining a second center-of-gravity position corresponding to a predetermined region on the face of the object to be detected in a preliminary image; and adjusting a light emission direction of light irradiated by the laser light source to cause the first center-of-gravity position and the second center-of-gravity position to coincide with each other, thereby obtaining image matrix data of the image of the face of the object to be detected that is irradiated by the laser light source whose light emission direction has been adjusted.

In addition, the living body detection system according to another embodiment of the present disclosure further comprises: performing binarization conversion on the image matrix data based on a second predetermined grayscale threshold to convert pixel dots having a grayscale value larger than or equal to the second predetermined grayscale threshold among the image matrix data into pixel dots of a first type having a first grayscale value, and convert pixel dots having a grayscale value smaller than the second predetermined grayscale threshold among the image matrix data into pixel dots of a second type having a second grayscale value, thereby obtaining second binarized image matrix data; and stopping irradiation if the number of pixel dots of the first type among the second binarized image matrix data exceeds a first predetermined number threshold.

In addition, the living body detection system according to another embodiment of the present disclosure further comprises: performing binarization conversion on the image matrix data based on a third predetermined grayscale threshold to convert pixel dots having a grayscale value larger than or equal to the third predetermined grayscale threshold among the image matrix data into pixel dots of a first type having a first grayscale value, and convert pixel dots having a grayscale value smaller than the third predetermined grayscale threshold among the image matrix data into pixel dots of a second type having a second grayscale value, thereby obtaining third binarized image matrix data; calculating a third center-of-gravity position corresponding to pixel dots of the first type among the third binarized image matrix data; and stopping irradiation if the third center-of-gravity position is outside a predetermined first range threshold.

In addition, the living body detection system according to another embodiment of the present disclosure further comprises: determining a predetermined pixel dot region corresponding to a predetermined region on the face of the object to be detected from among the image matrix data; calculating a first center-of-gravity position corresponding to a maximum number of interconnected pixel dots of the first type; and stopping irradiation if the first center-of-gravity position is within the predetermined pixel dot region.

In addition, the living body detection method according to an embodiment of the present disclosure further comprises: comparing the light spot area with a second predetermined area threshold, and stopping irradiation if the light spot area is greater than the second predetermined area threshold.

In addition, the living body detection method according to an embodiment of the present disclosure further comprises: determining a predetermined pixel dot corresponding to a predetermined point on the face of the object to be detected among the image matrix data; calculating a first center-of-gravity position corresponding to a maximum number of interconnected pixel dots of the first type; and calculating a distance between the first center-of-gravity position and the predetermined pixel dot, and stopping irradiation if the distance is smaller than a predetermined distance threshold.

In addition, the living body detection method according to an embodiment of the present disclosure further comprises: calculating a plurality of light spot areas corresponding to interconnected pixel dots of the first type; and stopping irradiation if one of the plurality of light spot areas is greater than a second predetermined area threshold or each of the plurality of spot areas is smaller than a third predetermined area threshold.

According to another embodiment of the present disclosure, there is provided a living body detection system, comprising: a laser light source unit configured to emit irradiation light to irradiate a face of an object to be detected; an image capturing unit configured to capture an image of the face of the object to be detected that is irradiated by the laser light source unit; and a living body detection unit configured to determine whether the object to be detected is a living body, wherein the living body detection unit calculates a light spot area of the image of the face of the object to be detected and compares the light spot area with a first predetermined area threshold, and determines that the object to be detected is a living body if the light spot area is greater than the first predetermined area threshold.

In addition, in the living body detection system according to another embodiment of the present disclosure, the living body detection unit acquires image matrix data of the image of the face of the object to be detected; the living body detection unit performs binarization conversion on the image matrix data based on a first predetermined grayscale threshold to convert pixel dots having a grayscale value larger than or equal to the first predetermined grayscale threshold among the image matrix data into pixel dots of a first type having a first grayscale value, and convert pixel dots having a grayscale value smaller than the first predetermined grayscale threshold among the image matrix data into pixel dots of a second type having a second grayscale value, thereby obtaining first binarized image matrix data, the first grayscale value being larger than the second grayscale value; and the living body detection unit determines a maximum number of interconnected pixel dots of the first type from among the first binarized image matrix data, and calculates an area corresponding to the maximum number of interconnected pixel dots of the first type as the light spot area.

In addition, in the living body detection system according to another embodiment of the present disclosure, the laser light source unit is a light source unit that generates a dot-shaped light spot, and positions of the laser light source unit and the object to be detected are relatively fixed.

In addition, in the living body detection system according to another embodiment of the present disclosure, the laser light source unit is a light source unit that generates a plurality of dot-shaped light spots, and positions of the laser light source unit and the object to be detected change relatively; the image capturing unit captures an image of the face of the object to be detected that is irradiated by the laser light source unit; and the living body detection unit determines a regional image corresponding to a predetermined region of the object to be detected in the image as an image of the face of the object to be detected.

In addition, in the living body detection system according to another embodiment of the present disclosure, the laser light source unit is a laser light source capable of adjusting a light emission direction, and positions of the laser light source unit and the object to be detected relatively change; the living body detection unit acquires preliminary image matrix data of the face of the object to be detected that is irradiated by the laser light source unit; the living body detection unit performs binarization conversion on the preliminary image matrix data based on a first predetermined grayscale threshold to convert pixel dots having a grayscale value larger than or equal to the first predetermined grayscale threshold among the preliminary image matrix data into pixel dots of a first type having a first grayscale value, and convert pixel dots having a grayscale value smaller than the first predetermined grayscale threshold among the preliminary image matrix data into pixel dots of a second type having a second grayscale value, thereby obtaining binarized preliminary image matrix data; the living body detection unit determines a maximum number of interconnected pixel dots of the first type from among the binarized preliminary image matrix data, and calculates a first center-of-gravity position corresponding to the maximum number of interconnected pixel dots of the first type; the living body detection unit determines a second center-of-gravity position corresponding to a predetermined region on the face of the object to be detected in a preliminary image; and the living body detection unit controls the laser light source unit to adjust a light emission direction to cause the first center-of-gravity position and the second center-of-gravity position to coincide with each other, thereby obtaining image matrix data of the image of the face of the object to be detected that is irradiated by the laser light source unit whose light emission direction has been adjusted.

In addition, in the living body detection system according to another embodiment of the present disclosure, the living body detection unit is further configured to: perform binarization conversion on the image matrix data based on a second predetermined grayscale threshold to convert pixel dots having a grayscale value larger than or equal to the second predetermined grayscale threshold among the image matrix data into pixel dots of a first type having a first grayscale value, and convert pixel dots having a grayscale value smaller than the second predetermined grayscale threshold among the image matrix data into pixel dots of a second type having a second grayscale value, thereby obtaining second binarized image matrix data; and control the laser light source unit to stop irradiation if the number of pixel dots of the first type among the second binarized image matrix data exceeds a first predetermined number threshold.

In addition, in the living body detection system according to another embodiment of the present disclosure, the living body detection unit is further configured to: perform binarization conversion on the image matrix data based on a third predetermined grayscale threshold to convert pixel dots having a grayscale value larger than or equal to the third predetermined grayscale threshold among the image matrix data into pixel dots of a first type having a first grayscale value, and convert pixel dots having a grayscale value smaller than the third predetermined grayscale threshold among the image matrix data into pixel dots of a second type having a second grayscale value, thereby obtaining third binarized image matrix data; calculate a third center-of-gravity position corresponding to pixel dots of the first type among the third binarized image matrix data; and control the laser light source unit to stop irradiation if the third center-of-gravity position is outside a predetermined first range threshold.

In addition, in the living body detection system according to another embodiment of the present disclosure, the living body detection unit is further configured to: determine a predetermined pixel dot region corresponding to a predetermined region on the face of the object to be detected from among the image matrix data; calculate a first center-of-gravity position corresponding to a maximum number of interconnected pixel dots of the first type; and control the laser light source unit to stop irradiation if the first center-of-gravity position is within the predetermined pixel dot region.

In addition, in the living body detection system according to another embodiment of the present disclosure, the living body detection unit is further configured to: compare the light spot area with a second predetermined area threshold, and control the laser light source unit to stop irradiation if the light spot area is greater than the second predetermined area threshold.

In addition, in the living body detection system according to another embodiment of the present disclosure, the living body detection unit is further configured to: determine a predetermined pixel dot corresponding to a predetermined point on the face of the object to be detected among the image matrix data; calculate a first center-of-gravity position corresponding to a maximum number of interconnected pixel dots of the first type; and calculate a distance between the first center-of-gravity position and the predetermined pixel dot, and control the laser light source unit to stop irradiation if the distance is smaller than a predetermined distance threshold.

In addition, in the living body detection system according to another embodiment of the present disclosure, the living body detection unit is further configured to: calculate a plurality of light spot areas corresponding to interconnected pixel dots of the first type; and control the laser light source unit to stop irradiation if one of the plurality of light spot areas is greater than a second predetermined area threshold or each of the plurality of spot areas is smaller than a third predetermined area threshold.

According to yet another embodiment of the present disclosure, there is provided a computer program product, comprising a tangible computer-readable medium on which computer program instructions configured to execute the following steps when being run by a computer are stored: capturing an image of a face of an object to be detected that is irradiated by a laser light source; calculating a light spot area of the image of the face of the object to be detected; and comparing the light spot area with a first predetermined area threshold, and determining that the object to be detected is a living body if the light spot area is greater than the first predetermined area threshold.

It is to be understood that both the foregoing general descriptions and the following detailed descriptions are exemplary and intended to provide further explanations of the claimed technique.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure.

Hereinafter, preferred embodiments of the present disclosure will be described in detail with reference to the accompanying drawings.

Figure 1:
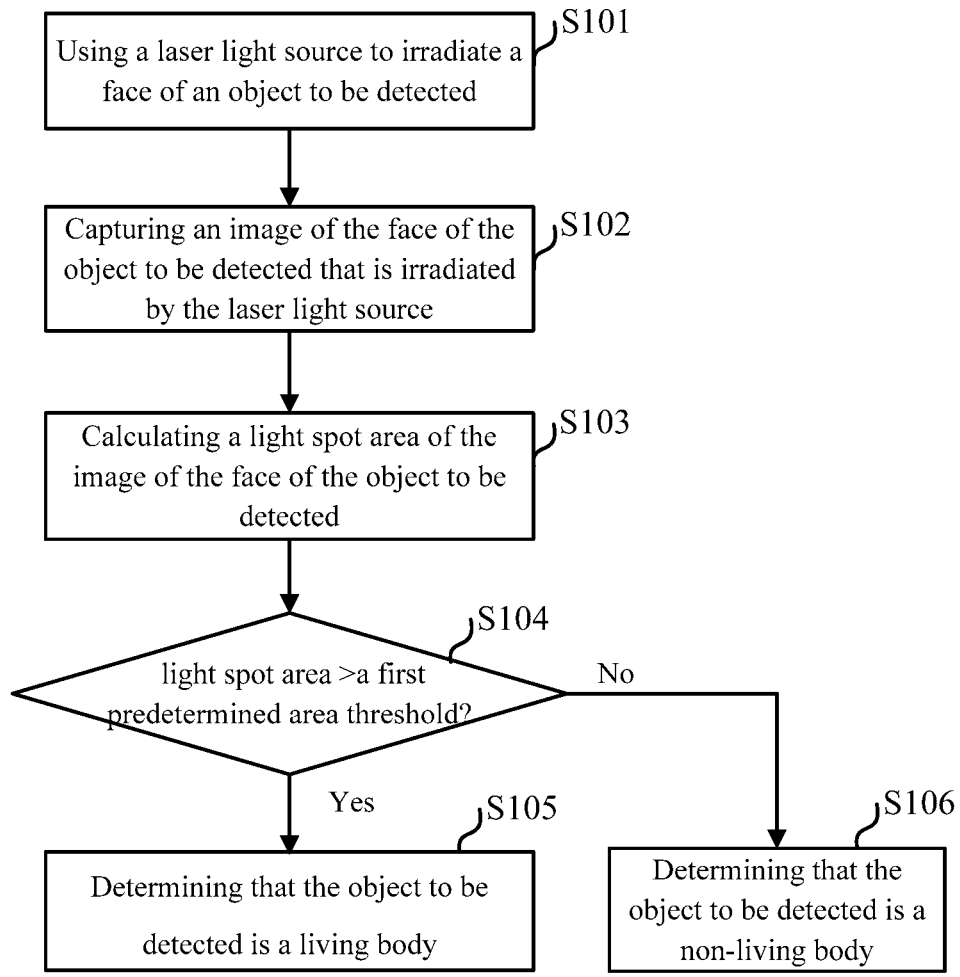
FIG. 1 is a flowchart illustrating the living body detection method according to an embodiment of the present disclosure.

FIG. 1 is a flowchart illustrating the living body detection method according to an embodiment of the present disclosure. As shown in FIG. 1, the living body detection method according to an embodiment of the present disclosure comprises the following steps.

In step S101, a laser light source is used to irradiate a face of an object to be detected. As will be described in detail, the laser light source may be a light source that generates a dot-shaped light spot, or a light source that generates a plurality of dot-shaped light spots. Alternatively, the laser light source is a laser light source capable of adjusting a light emission direction. Thereafter, the processing advances to step S102.

In step S102, an image of the face of the object to be detected that is irradiated by the laser light source is captured. As will be described in detail below, a light spot formed by subsurface scattering will be included in the image of the face of the object to be detected. Thereafter, the processing advances to step S103.

In step S103, a light spot area S of the image of the face of the object to be detected is calculated. The specific processing procedure of calculating the light spot area will be described below. Depending on a different laser light source adopted, the light spot area may represent area of a dot-shaped light spot and may also represent thickness of a strip-shaped light spot. Thereafter, the processing advances to step S104.

In step S104, it is determined whether the light spot area S calculated in step S103 is larger than a first predetermined area threshold T1. The first predetermined area threshold T1 is a value determined and set in advance using statistical learning methods such as depth learning, support vector machine, and the like, while taking a large number of face images as positive samples and taking photos, video playbacks, paper masks, and 3D model images as negative samples.

If a positive result is obtained in step S104, that is, the light spot area S is larger than the first predetermined area threshold T1, the processing advances to step S105. In step S105, it is determined that the object to be detected is a living body.

In contrast, if a negative result is obtained in step S104, that is, the light spot area S is not larger than the first predetermined area threshold T1, the processing advances to step S106. In step S106, it is determined that the object to be detected is a non-living body.

In the living body detection method according to an embodiment of the present disclosure above described, it is based on the principle that human skin causes subsurface scattering to light so that a larger light spot is generated upon receiving the light, whereas subsurface scattering of photo, screen, mask and the like is very weak comparatively so that only a smaller light spot is formed. In the case where illumination conditions are the same, the predetermined area threshold should be smaller than the light spot formed by subsurface scattering of human skin to the light, and larger than a light spot formed by subsurface scattering of the objects such as photo, screen, mask and the like. An actual numeric of the predetermined area threshold may be set according to an actual situation, no limitation is made herein. By determining magnitude relationship between the obtained light spot area and the predetermined area threshold, the object to be detected having the light spot area larger than the predetermined area threshold is determined as a living body.

In addition, in the living body detection method according to an embodiment of the present disclosure, since the laser light source is used and there is no need to confine the user's action cooperation, a security control mechanism needs to be set so as to prevent the laser light source from illuminating eyes of the object to be detected or to prevent the object to be detected from deviating from a detection region and other special circumstances.

The living body detection method according to an embodiment of the present disclosure described above carries out living body detection by determining a size of a light spot caused by subsurface scattering after the object to be detected is irradiated by a laser light source, thereby effectively preventing attacks from photos, 3D face models, and masks.

Hereinafter, the living body detection system that executes the above-described living body detection method will be further described with reference to FIG. 2.

Figure 2:
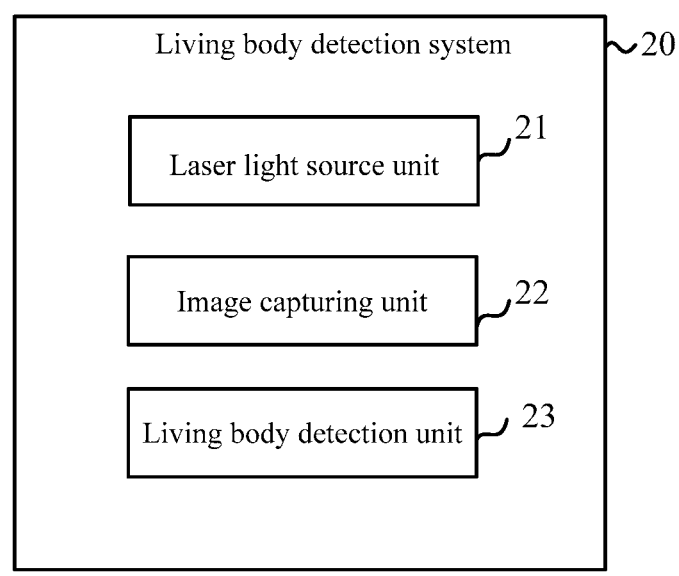
FIG. 2 is a functional block diagram illustrating the living body detection system according to an embodiment of the present disclosure.

FIG. 2 is a functional block diagram illustrating the living body detection system according to an embodiment of the present disclosure. As shown in FIG. 2, the living body detection system 20 according to an embodiment of the present disclosure comprises a laser light source unit 21, an image capturing unit 22, and a living body detection unit 23. The laser light source unit 21, the image capturing unit 22, and the living body detection unit 23 may be configured by, for example, hardware, software, firmware, and any feasible combinations thereof.

Specifically, the laser light source unit 21 is configured to emit irradiation light to irradiate a face of an object to be detected. In an embodiment of the present disclosure, the laser light source may be a dot-shaped laser having a power of 5 mW and an output wavelength of 850 nm. Location and angle of the laser light source should be arranged to ensure that it can irradiate an appropriate part on the face of the object to be detected, such as lips, cheeks, and nose where facial skins are relatively exposed and flattened. As described above, the laser light source unit 21 may be a light source that generates a dot-shaped light spot, or the laser light source unit 21 may be a light source that generates a plurality of dot-shaped light spots. Alternatively, the laser light source unit 21 is a laser light source capable of adjusting a light emission direction.

The image capturing unit 22 is configured to capture an image of the face of the object to be detected that is irradiated by the laser light source unit 21. In an embodiment of the present disclosure, the image capturing unit 22 is configured corresponding to the laser light source unit 21. For example, the image capturing unit 22 is a CCD imaging module configured with an 850 nm narrowband light filter, exposure parameters of the image capturing unit 22 enable this unit to capture the light spot formed by subsurface scattering. The image capturing unit 22 may be physically separated from the subsequent living body detection unit 23 or may be physically located in the same place or even within the same housing together with the subsequent living body detection unit 23. In the case where the image capturing unit 22 is physically separated from the subsequent living body detection unit 23, the image capturing unit 22 further transmits, in a wired or wireless manner, an acquired image of the face of the object to be detected to the living body detection unit 23 as provided subsequently. In the case where the image capturing unit 22 and the subsequent living body detection unit 23 are physically located at the same position or even inside the same housing, the image capturing unit 22 transmits the image of the face of the object to be detected to the living body detection unit 23 via an internal bus. Prior to transmitting the video data in a wired or wireless manner or via a bus, it is possible to encode the video data with a predetermined format and compress it as a video packet, so as to reduce traffic and bandwidth that are required by the transmission.

The living body detection unit 23 is configured to determine whether the object to be detected is a living body. Specifically, the living body detection unit 23 calculates the light spot area S of the image of the face of the object to be detected, and compares the light spot area S with a first predetermined area threshold T1, and determines that the object to be detected is a living body if the light spot area S is larger than the first predetermined area threshold T1.

The living body detection method and the living body detection system according to the embodiments of the present disclosure have been described above with reference to FIGS. 1 and 2. Hereinafter, the first to third exemplary living body detection method and living body detection system according to the embodiments of the present disclosure will be further described with reference to FIGS. 3 to 8.

Figure 3:
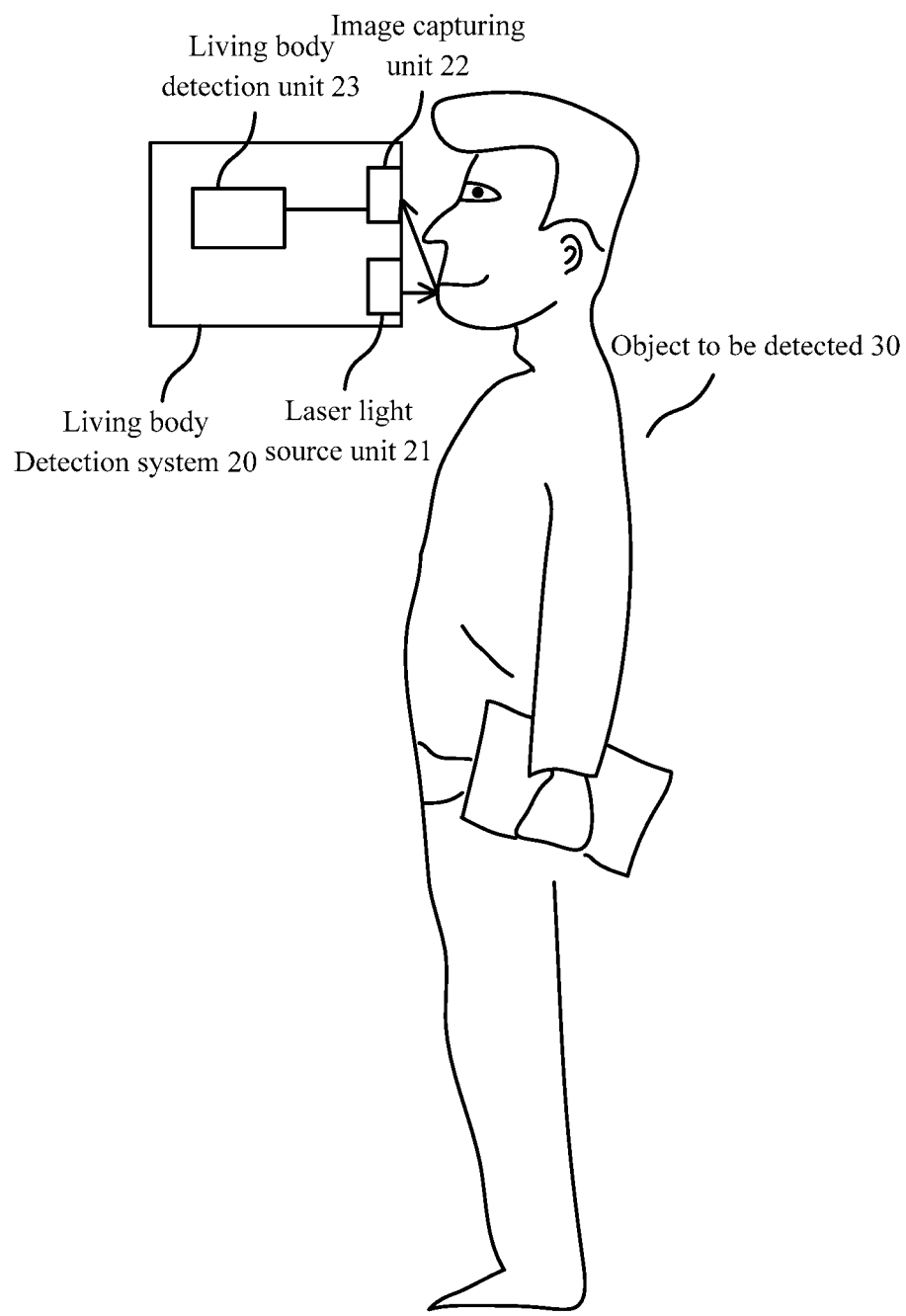
FIG. 3 is a schematic diagram further illustrating a first exemplary living body detection system according to an embodiment of the present disclosure.

FIG. 3 is a schematic diagram further illustrating a first exemplary living body detection system according to an embodiment of the present disclosure.

As shown in FIG. 3, positions of the living body detection system 20 and the object 30 to be detected are relatively fixed. For example, the living body detection system 20 shown in FIG. 3 is a face card reader with a short working distance. Specifically, the laser light source unit 21 in the living body detection system 20 shown in FIG. 3 is a light source unit that generates a dot-shaped light spot, and positions of the laser light source unit 21 and the object 30 to be detected are relatively fixed. The laser light source unit 21 emits irradiation light to irradiate the face of the object to be detected, for example, irradiating lips, cheeks, nose, and the like. The image capturing unit 22 shown captures an image of the face of the object to be detected as illuminated by the laser light source unit 21. The living body detection unit 23 shown determines whether the object to be detected is a living body.

Figure 4:
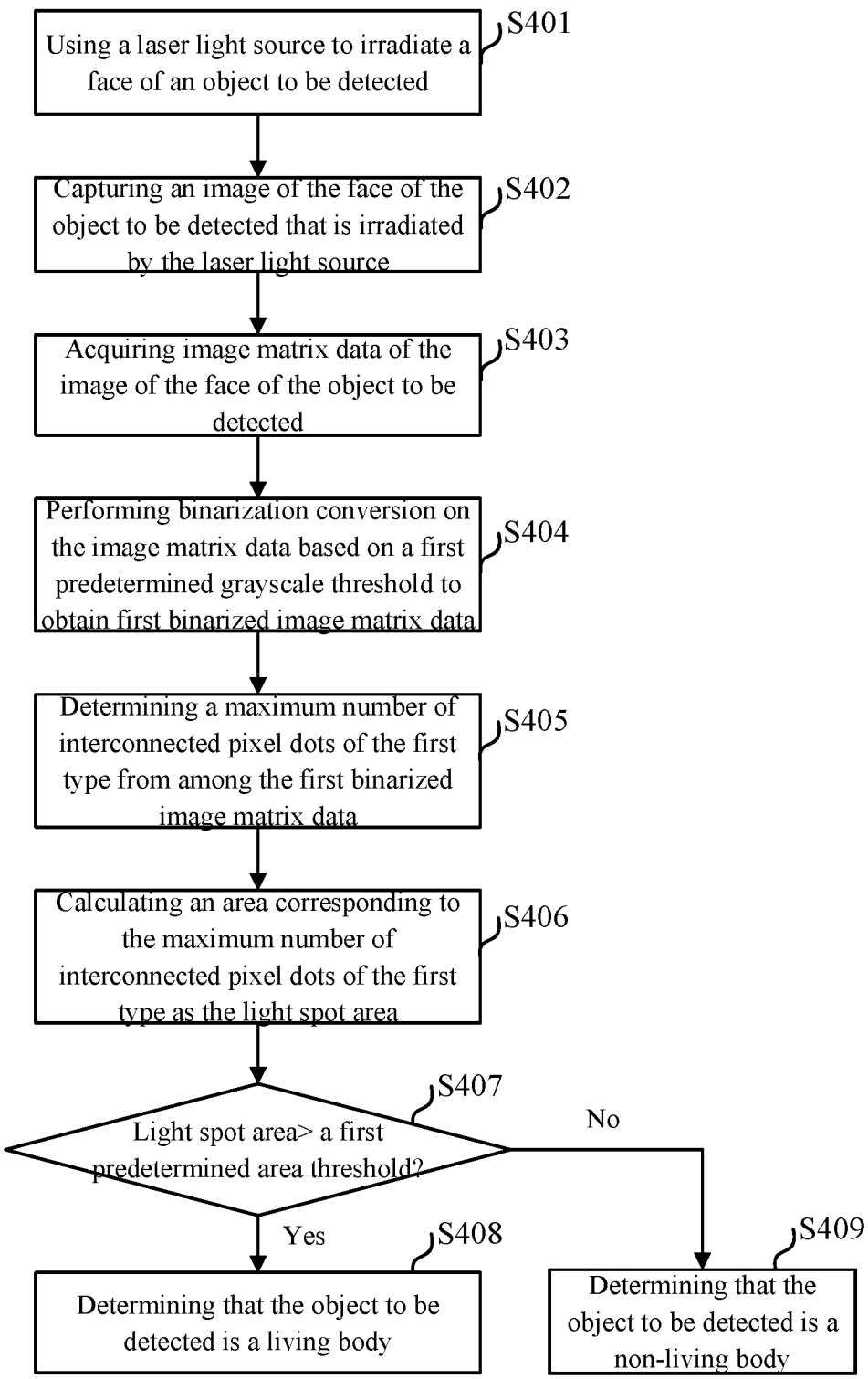
FIG. 4 is a flowchart further illustrating a first exemplary living body detection method according to an embodiment of the present disclosure.

FIG. 4 is a flowchart further illustrating a first exemplary living body detection method according to an embodiment of the present disclosure. As shown in FIG. 4, the first exemplary living body detection method according to an embodiment of the present disclosure is applied to the first exemplary living body detection system according to an embodiment of the present disclosure as shown in FIG. 3, said method comprises the following steps.

In step S401, a laser light source is used to irradiate a face of an object to be detected. In a first example of the embodiment of the present disclosure, the laser light source may be a light source that generates a dot-shaped light spot. Thereafter, the processing advances to step S402.

In step S402, an image of the face of the object to be detected that is irradiated by the laser light source is captured. Thereafter, the processing advances to step S403.

In step S403, image matrix data of the image of the face of the object to be detected is acquired. In the first example of the embodiment of the present disclosure, the image matrix data of the image of the face of the object to be detected may be represented as I [x, y]. Thereafter, the processing advances to step S404.

In step S404, binarization conversion is performed on the image matrix data based on a first predetermined grayscale threshold to convert pixel dots having a grayscale value larger than or equal to the first predetermined grayscale threshold among the image matrix data into pixel dots of a first type having a first grayscale value, and convert pixel dots having a grayscale value smaller than the first predetermined grayscale threshold among the image matrix data into pixel dots of a second type having a second grayscale value, thereby obtaining first binarized image matrix data, the first grayscale value being larger than the second grayscale value. The first binarized image matrix data may be expressed as:

$$Ib[x, y] = \left\{ \begin{array}{l} 1, I[x, y] \geq t1 \\ 0, I[x, y] < t1 \end{array} \right\}$$

where t1 is the first predetermined grayscale threshold. Thereafter, the processing advances to step S405.

In step S405, a maximum number of interconnected pixel dots of the first type is determined from among the first binarized image matrix data. In an embodiment of the present disclosure, a breadth-first search (BFS) algorithm is applied to the first binarized image matrix data Ib to calculate interconnected components, thereby selecting a maximum number of interconnected components. Thereafter, the processing advances to step S406.

In step S406, an area corresponding to the maximum number of interconnected pixel dots of the first type is calculated as the light spot area S. Thereafter, the processing advances to step S407.

In step S407, it is determined whether the light spot area S calculated in step S406 is larger than a first predetermined area threshold T1. The first predetermined area threshold T1 is a value determined and set in advance using statistical learning methods such as depth learning, support vector machine, and the like, while taking a large number of face images as positive samples and taking photos, video playbacks, paper masks, and 3D model images as negative samples.

If a positive result is obtained in step S4074, that is, the light spot area S is larger than the first predetermined area threshold T1, the processing advances to step S408. In step S408, it is determined that the object to be detected is a living body.

In contrast, if a negative result is obtained in step S407, that is, the light spot area S is not larger than the first predetermined area threshold T1, the processing advances to step S409. In step S409, it is determined that the object to be detected is a non-living body.

As described above, a security control mechanism needs to be set so as to prevent the laser light source from illuminating eyes of the object to be detected or to prevent the object to be detected from deviating from a detection region and other special circumstances.

First Security Control Mechanism

After capturing the image of the face of the object to be detected that is irradiated by the laser light source, similar to the processing in the above step S404, binarization conversion is performed on the image matrix data based on a second predetermined grayscale threshold t2 to convert pixel dots having a grayscale value larger than or equal to the second predetermined grayscale threshold among the image matrix data into pixel dots of a first type having a first grayscale value, and convert pixel dots having a grayscale value smaller than the second predetermined grayscale threshold t2 among the image matrix data into pixel dots of a second type having a second grayscale value, thereby obtaining second binarized image matrix data. Irradiation is stopped if the number of pixel dots of the first type among the second binarized image matrix data exceeds a first predetermined number threshold s1, that is, a plurality of bright light spots occur abnormally.

Second Security Control Mechanism

After capturing the image of the face of the object to be detected that is irradiated by the laser light source, similar to the processing in the above step S404, binarization conversion is performed on the image matrix data based on a third predetermined grayscale threshold t3 to convert pixel dots having a grayscale value larger than or equal to the third predetermined grayscale threshold among the image matrix data into pixel dots of a first type having a first grayscale value, and convert pixel dots having a grayscale value smaller than the third predetermined grayscale threshold t3 among the image matrix data into pixel dots of a second type having a second grayscale value, thereby obtaining third binarized image matrix data. A third center-of-gravity position (mx, my) corresponding to pixel dots of the first type among the third binarized image matrix data is calculated. Irradiation is stopped if the third center-of-gravity position (mx, my) is outside a predetermined first range threshold (that is, mx≥mx1 or mx≤mx0; my≥my1 or my≤my0), that is, the light spot falls outside a predetermined image acquisition region.

Third Security Control Mechanism

After capturing the image of the face of the object to be detected that is irradiated by the laser light source, a predetermined pixel dot region corresponding to a predetermined region on the face of the object to be detected is determined from among the image matrix data. For example, a pretrained face detector (such as Haar Cascade) is used to obtain positions of the face and left and right eyes. Similar to the processing in the above step S404, a first center-of-gravity position corresponding to a maximum number of interconnected pixel dots of the first type is calculated. Irradiation is stopped if the first center-of-gravity position is within the predetermined pixel dot region (i.e., the left and right eye region).

The first exemplary living body detection system according to an embodiment of the present disclosure is configured with a light source unit that generates a dot-shaped light spot, it is applied in a scenario where positions of the light source unit and the object to be detected are relatively fixed, said system performs living body detection by utilizing the principle that skins of a living body have different subsurface scattering properties in comparison to other materials, can effectively defend attacks from photo, video, mask, without requiring the user's special cooperation, security and ease-of-use of the living body detection system are increased.

Figure 5:
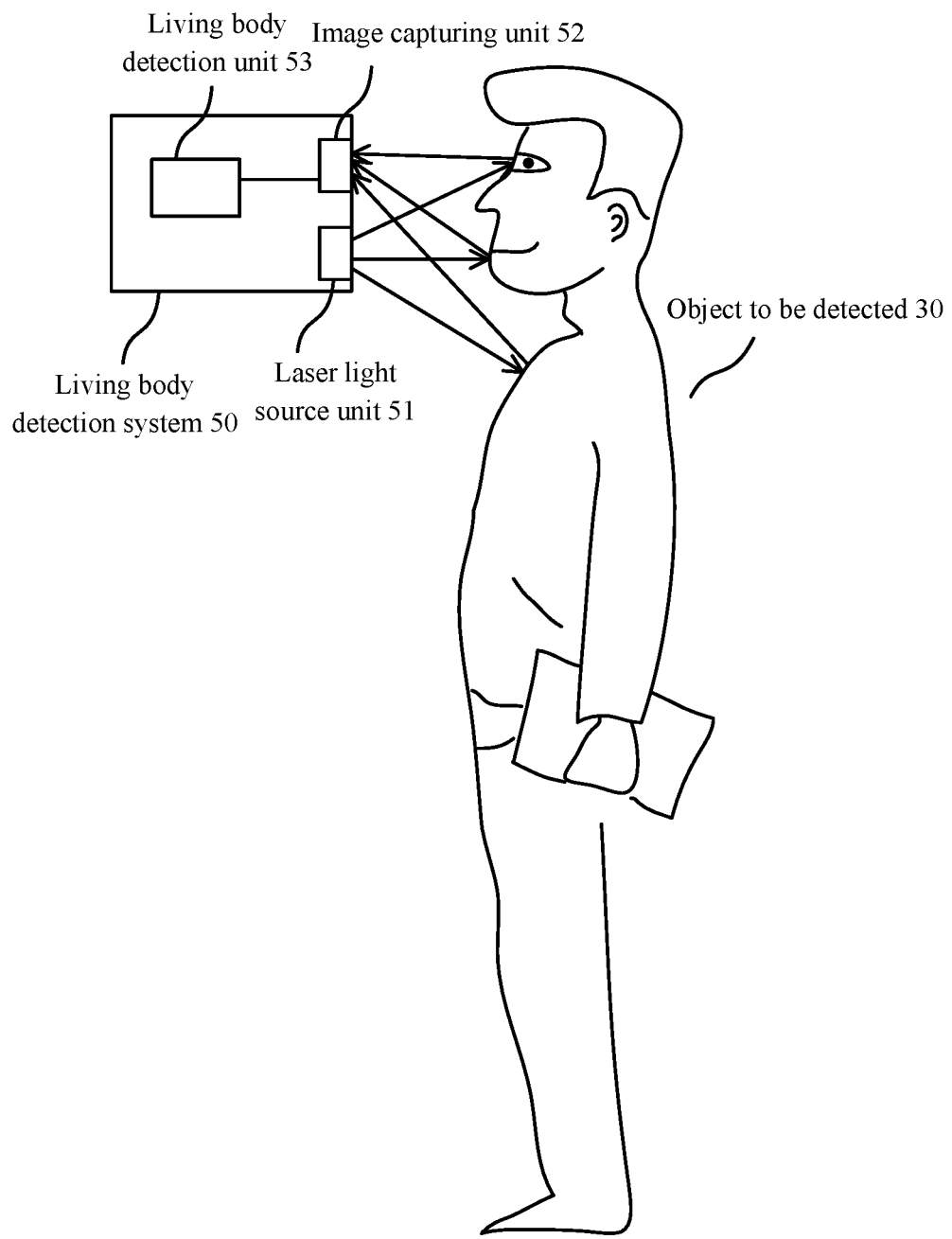
FIG. 5 is a schematic diagram further illustrating a second exemplary living body detection system according to an embodiment of the present disclosure.

FIG. 5 is a schematic diagram further illustrating a second exemplary living body detection system according to an embodiment of the present disclosure.

As shown in FIG. 5, positions of the living body detection system 50 and the object 30 to be detected are relatively unfixed. For example, the living body detection system 50 shown in FIG. 5 is an access control system that has a longer working distance than the face card reader in FIG. 3. The laser light source 51 is a light source that generates a plurality of light dot-shaped light spots, and positions of the laser light source 51 and the object 30 to be detected relatively change. In an embodiment of the present disclosure, the laser light source 51 is configured by a laser having a power of 500 mW and a wavelength of 850 nm together with a grating. With the grating, the plurality of dot-shaped light spots projected by the laser uniformly distribute in a range where the object 30 to be detected may exist, and ranges of light spots of respective dots do not coincide. The image capturing unit 52 shown captures an image of the face of the object to be detected that is irradiated by the laser light source unit 51. The living body detection unit 53 shown determines whether the object to be detected is a living boy.

Figure 6:
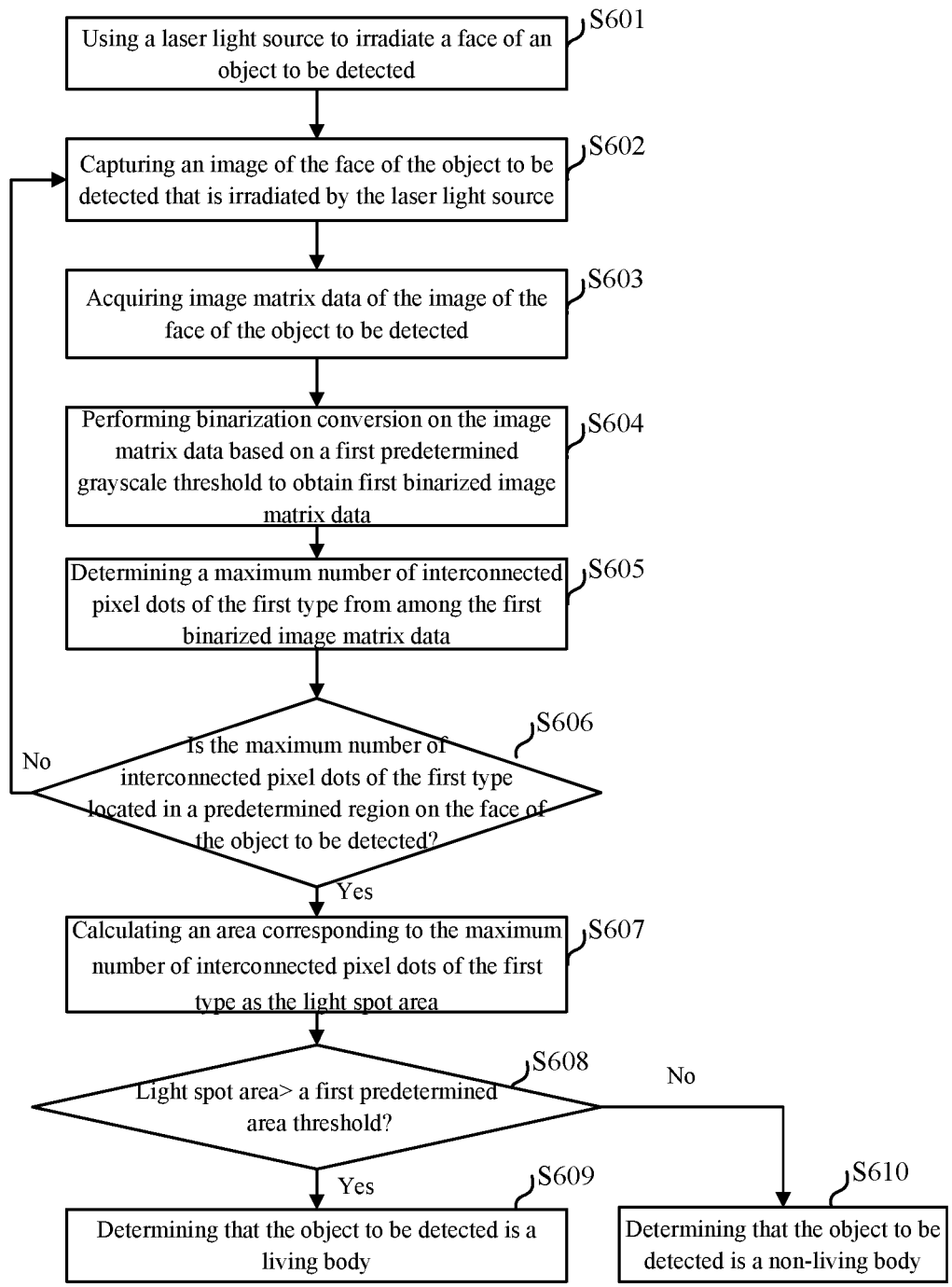
FIG. 6 is a flowchart further illustrating a second exemplary living body detection method according to an embodiment of the present disclosure.

FIG. 6 is a flowchart further illustrating a second exemplary living body detection method according to an embodiment of the present disclosure. As shown in FIG. 6, the second exemplary living body detection method according to an embodiment of the present disclosure is applied to the second exemplary living body detection system according to an embodiment of the present disclosure shown in FIG. 5, said method comprises the following steps.

Steps S601 to S605 illustrated in FIG. 6 are the same as steps S401 to S405 illustrated in FIG. 4 as described above, respectively, repeated description thereof will be omitted herein.

After binarizing the image of the face of the object to be detected to determine the maximum number of interconnected pixel dots of the first type from among the first binarization image matrix data, it is determined that the maximum number of interconnected pixel dots of the first type is located in a predetermined region on the face of the object to be detected in step S606. Since the laser light source 51 is a light source that generates a plurality of dot-shaped light spots in the second exemplary living body detection system according to an embodiment of the present disclosure, if a positive result is obtained in step S606, it indicates that one of the plurality of dot-shaped light spots generated by the laser light source 51 falls within an appropriate region, such as lips, cheeks, and nose, then the processing advances to step S607.

In step S607, an area corresponding to the maximum number of interconnected pixel dots of the first type is calculated as the light spot area S. Thereafter, the processing advances to step S608.

In step S608, it is determined whether the light spot area S calculated in step S607 is larger than the first predetermined area threshold T1. The first predetermined area threshold T1 is a value determined and set in advance using statistical learning methods such as depth learning, support vector machine, and the like, while taking a large number of face images as positive samples and taking photos, video playbacks, paper masks, and 3D model images as negative samples.

If a positive result is obtained in step S608, that is, the light spot area S is larger than the first predetermined area threshold T1, the processing advances to step S609. In step S609, it is determined that the object to be detected is a living body.

In contrast, if a negative result is obtained in step S608, that is, the light spot area S is not larger than the first predetermined area threshold T1, the processing advances to step S610. In step S610, it is determined that the object to be detected is a non-living body.

Returning to step S606, if a negative result is obtained in step S606, it indicates that a plurality of dot-shaped light spots generated by the laser light source 51 do not fall within an appropriate region such as lips, cheeks, and nose, then the processing returns to step S602 to continue capturing an image of the face of the object to be detected that is irradiated by the laser light source.

Like the first example shown in FIGS. 3 and 4, a security control mechanism is also provided in the second exemplary living body detection system according to an embodiment of the present disclosure.

First Security Control Mechanism

Like the first security control mechanism in the first example as described above, after capturing the image of the face of the object to be detected that is irradiated by the laser light source, similar to the processing in the above step S404, binarization conversion is performed on the image matrix data based on a second predetermined grayscale threshold t2 to convert pixel dots having a grayscale value larger than or equal to the second predetermined grayscale threshold t2 among the image matrix data into pixel dots of a first type having a first grayscale value, and convert pixel dots having a grayscale value smaller than the second predetermined grayscale threshold t2 among the image matrix data into pixel dots of a second type having a second grayscale value, thereby obtaining second binarized image matrix data. Irradiation is stopped if the number of pixel dots of the first type among the second binarized image matrix data exceeds a first predetermined number threshold s1, that is, a plurality of bright light spots occur abnormally.

Second Security Control Mechanism

After calculating the area corresponding to the maximum number of interconnected pixel dots of the first type as the light spot area S in step S607, the light spot area S is compared with a second predetermined area threshold T2, the second predetermined area threshold T2 is larger than the first predetermined area threshold T1. Irradiation is stopped if there is the light spot area S larger than the second predetermined area threshold T2, that is, there is a light spot with excessive area.

Third Security Control Mechanism

Similar to the third security mechanism in the first example described above, after capturing the image of the face of the object to be detected that is irradiated by the laser light source, a predetermined pixel dot region corresponding to a predetermined region on the face of the object to be detected is determined from among the image matrix data. For example, a pre-trained face detector (such as Haar Cascade) is used to obtain positions of the face and left and right eyes. Further, similar to the processing in the above step S605, a position of the light spot closest to the left and right eyes is determined, and a distance D of the nearest light spot from the left and right eyes is calculated. If the distance D is smaller than a predetermined distance threshold d, it indicates that the light spot is too close to the eyes of the object to be detected, irradiation is stopped.

The second exemplary living body detection system according to an embodiment of the present disclosure is configured with a light source unit that generates a plurality of light spot-shaped light spots, it is applied in a scenario where positions of the light source unit and the object to be detected are relatively unfixed, said system performs living body detection by utilizing the principle that skins of a living body have different subsurface scattering properties in comparison to other materials, can effectively defend attacks from photo, video, mask, without requiring the user's special cooperation, security and ease-of-use of the living body detection system are increased.

Figure 7:
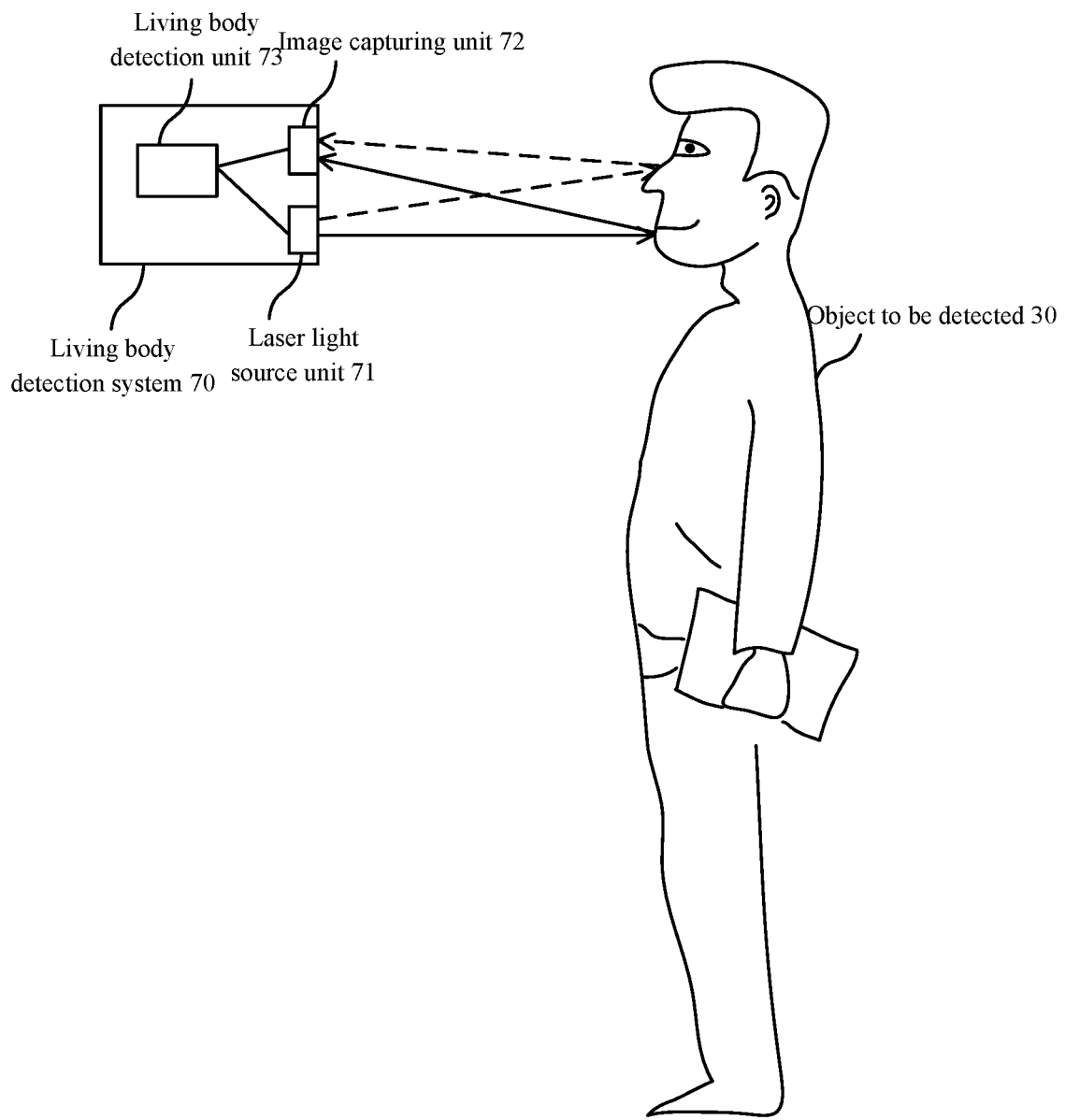
FIG. 7 is a schematic diagram further illustrating a third exemplary living body detection system according to an embodiment of the present disclosure.

FIG. 7 is a schematic diagram further illustrating a third exemplary living body detection system according to an embodiment of the present disclosure.

As shown in FIG. 7, positions of the living body detection system 70 and the object 30 to be detected are relatively unfixed, their mutual positions may change largely. For example, the living body detection system 70 shown in FIG. 7 is an access control system or a monitoring system with a working distance longer than that of the face card reader in FIG. 3 and the access control system in FIG. 5. The laser light source unit 71 is a laser light source capable of adjusting a light emission direction. In an embodiment of the present disclosure, the laser light source 71 is configured by a laser having a power of 20 mW and a wavelength of 850 nm and an emission direction driving unit (not shown). The living body detection unit 73 may acquire positions of a face and an appropriate region on the face and a current light spot, by using a pre-trained face detector (such as Haar Cascade) according to a preliminary image of the face of the object to be detected that is irradiated by the laser light source unit 71, as captured by the image capturing unit 72. The emission direction driving unit is controlled by the living body detection unit 73 (alternatively, it may be a separately configured light spot position tracking unit) to adjust the light emission direction of the laser light source unit 71 so that the position of the light spot falls on a suitable region.

Figure 8:
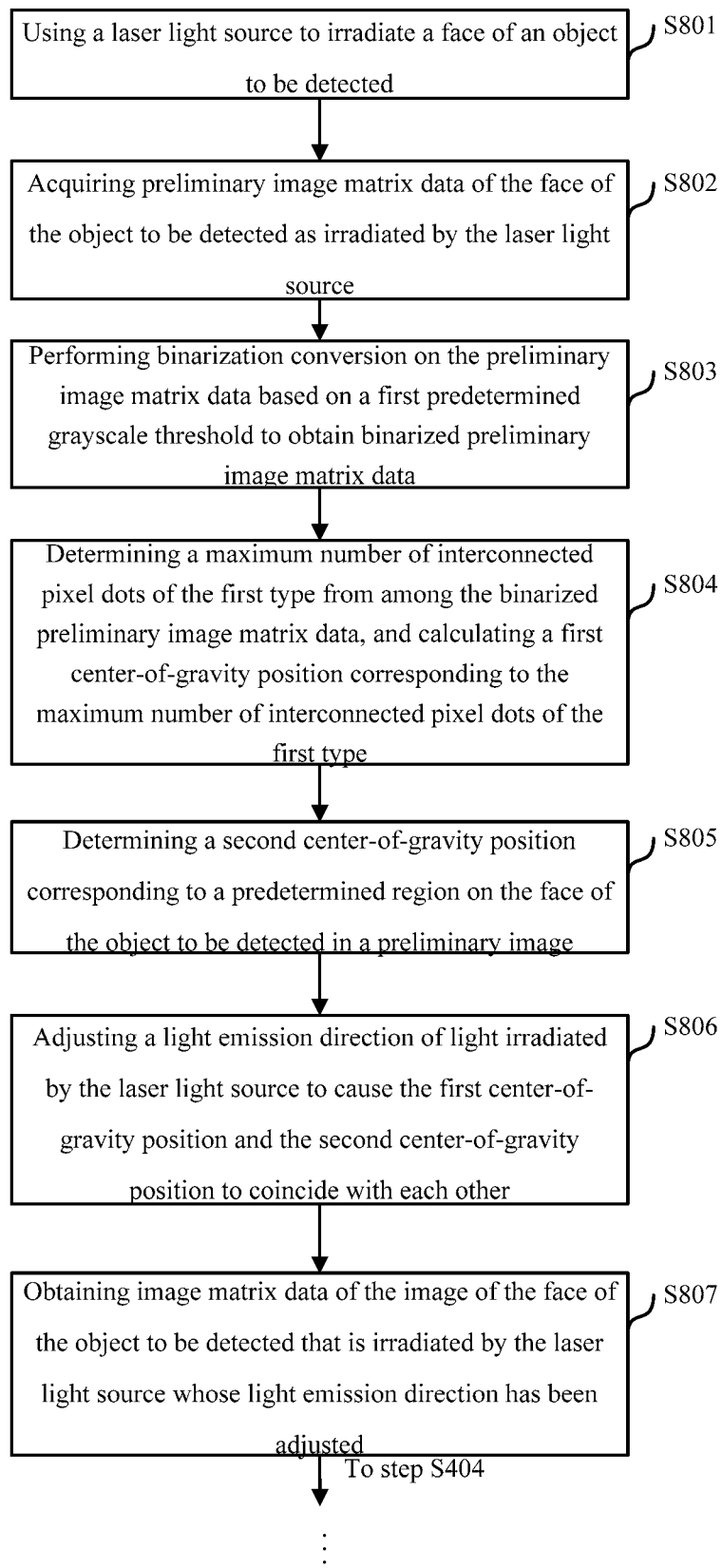
FIG. 8 is a flowchart further illustrating a third exemplary living body detection method according to an embodiment of the present disclosure.

FIG. 8 is a flowchart further illustrating a third exemplary living body detection method according to an embodiment of the present disclosure. As shown in FIG. 8, the third exemplary living body detection method according to an embodiment of the present disclosure is applied to the third exemplary living body detection system according to an embodiment of the present disclosure shown in FIG. 7, said method comprises the following steps.

In step S801, a laser light source is used to irradiate a face of an object to be detected. In a third example of the embodiment of the present application, the laser light source is a laser light source capable of adjusting a light emission direction. Thereafter, the processing advances to step S802.

In step S802, preliminary image matrix data of the face of the object to be detected that is irradiated by the laser light source is acquired. Thereafter, the processing advances to step S803.

In step S803, similar to the processing in step S404, binarization conversion is performed on the preliminary image matrix data based on the first predetermined grayscale threshold, to convert pixel dots having a grayscale value larger than or equal to the first predetermined grayscale threshold among the preliminary image matrix data into pixel dots of a first type having a first grayscale value, and convert pixel dots having a grayscale value smaller than the first predetermined grayscale threshold among the preliminary image matrix data into pixel dots of a second type having a second grayscale value, thereby obtaining binarized preliminary image matrix data. Thereafter, the processing advances to step S804.

In step S804, a maximum number of interconnected pixel dots of the first type is determined from among the binarized preliminary image matrix data, and a first center-of-gravity position corresponding to the maximum number of interconnected pixel dots of the first type is calculated. In an embodiment of the present disclosure, the first center-of-gravity position corresponding to the maximum number of interconnected pixel dots of the first type is the position where the current light spot resides. Thereafter, the processing advances to step S805.

In step S805, a second center-of-gravity position corresponding to a predetermined region on the face of the object to be detected in a preliminary image is determined. In an embodiment of the present disclosure, the second center-of-gravity position corresponding to a predetermined region on the face of the object to be detected is a position of an appropriate region on the face. Thereafter, the processing advances to step S806.

In step S806, a light emission direction of the light irradiated by the laser light source is adjusted to cause the first center-of-gravity position and the second center-of-gravity position to coincide with each other. In other words, the light emission direction of the light irradiated by the laser light source is adjusted so that the position of the light spot falls on the appropriate region on the face. Thereafter, the processing advances to step S807.

In step S807, image matrix data of the image of the face of the object to be detected that is irradiated by the laser light source whose light emission direction has been adjusted is acquired. The image matrix data of the image of the face of the object to be detected acquired in step S807 is the image matrix data to be finally used for living body detection.

Thereafter, the processing advances to step S404 as shown in FIG. 4, and steps S404 to S409 shown with reference to FIG. 4 in the above are executed, so as to perform living body detection based on the image matrix data of the image of the face of the object to be detected.

Like the first and second examples shown in FIGS. 3 to 6, a security control mechanism is also provided in the third exemplary living body detection system according to an embodiment of the present disclosure.

For example, after step S807, a plurality of light spot areas corresponding to interconnected pixel dots of the first type are calculated. If one of the plurality of light spot areas is greater than the second predetermined area threshold T2 or each of the plurality of light spot areas is smaller than the third predetermined area threshold T3, that is, there is a light spot that is too large or too small, irradiation is stopped.

In addition, an average pixel value of the image of the face of the object to be detected may be determined. If the average pixel value is not within a preset range, that is, there is the situation that the entire image is too bright or too dark, irradiation is stopped.

Further, a size of a facial image of the face of the object to be detected may also be determined. If the size of the facial image is not within a preset range, that is, there is the situation the size of the face is too large or too small, irradiation is stopped.

The third exemplary living body detection system according to an embodiment of the present disclosure is configured with a light source unit capable of adjusting a light emission direction and tracking an appropriate region on the object to be detected, it is applied in a scenario where positions of the light source unit and the object to be detected are relatively unfixed and distance between them is relatively far, said system performs living body detection by utilizing the principle that skins of a living body have different subsurface scattering properties in comparison to other materials, can effectively defend attacks from photo, video, mask, without requiring the user's special cooperation, security and ease of use of the living body detection system are increased.

Figure 9:
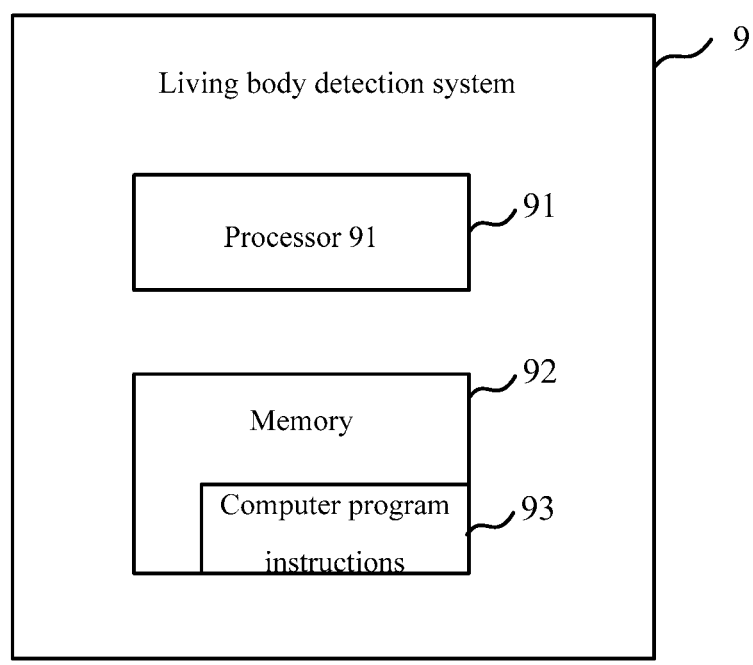
FIG. 9 is a schematic block diagram illustrating the living body detection system according to an embodiment of the present disclosure.

FIG. 9 is a schematic block diagram illustrating the living body detection system according to an embodiment of the present disclosure. As shown in FIG. 9, the living body detection system 9 according to an embodiment of the present disclosure comprises a processor 91, a memory 92, and computer program instructions 93 stored in the memory 92.

The computer program instructions 93 can achieve functions of respective functional modules of the living body detection system according to an embodiment of the present disclosure and/or execute respective steps of the living body detection method according to an embodiment of the present disclosure, when being run on the processor 91.

Specifically, when the computer program instructions 93 are run by the processor 91, the following steps are executed: using a laser light source to irradiate a face of an object to be detected; capturing an image of the face of the object to be detected that is irradiated by the laser light source; calculating a light spot area of the image of the face of the object to be detected; and comparing the light spot area with a first predetermined area threshold, and determining that the object to be detected is a living body if the light spot area is greater than the first predetermined area threshold.

In addition, the step of calculating a light spot area of the image of the face of the object to be detected executed when the computer program instructions 93 are run by the processor 91 comprises: acquiring image matrix data of the image of the face of the object to be detected; performing binarization conversion on the image matrix data based on a first predetermined grayscale threshold to convert pixel dots having a grayscale value larger than or equal to the first predetermined grayscale threshold among the image matrix data into pixel dots of a first type having a first grayscale value, and convert pixel dots having a grayscale value smaller than the first predetermined grayscale threshold among the image matrix data into pixel dots of a second type having a second grayscale value, thereby obtaining first binarized image matrix data, the first grayscale value being larger than the second grayscale value; and determining a maximum number of interconnected pixel dots of the first type from among the first binarized image matrix data, and calculating an area corresponding to the maximum number of interconnected pixel dots of the first type as the light spot area.

In addition, the step of capturing an image of the face of the object to be detected that is irradiated by the laser light source executed when the computer program instructions 93 are run by the processor 91 comprises: capturing an image of the face of the object to be detected that is irradiated by the laser light source, and determining a regional image corresponding to a predetermined region of the object to be detected in said image as an image of the face of the object to be detected.

In addition, the step of acquiring image matrix data of the image of the face of the object to be detected executed when the computer program instructions 93 are run by the processor 91 comprises: acquiring preliminary image matrix data of the face of the object to be detected that is irradiated by the laser light source; performing binarization conversion on the preliminary image matrix data based on a first predetermined grayscale threshold to convert pixel dots having a grayscale value larger than or equal to the first predetermined grayscale threshold among the preliminary image matrix data into pixel dots of a first type having a first grayscale value, and convert pixel dots having a grayscale value smaller than the first predetermined grayscale threshold among the preliminary image matrix data into pixel dots of a second type having a second grayscale value, thereby obtaining binarized preliminary image matrix data; determining a maximum number of interconnected pixel dots of the first type from among the binarized preliminary image matrix data, and calculating a first center-of-gravity position corresponding to the maximum number of interconnected pixel dots of the first type; determining a second center-of-gravity position corresponding to a predetermined region on the face of the object to be detected in a preliminary image; and adjusting a light emission direction of light irradiated by the laser light source to cause the first center-of-gravity position and the second center-of-gravity position to coincide with each other, thereby obtaining image matrix data of the image of the face of the object to be detected that is irradiated by the laser light source whose light emission direction has been adjusted.

Respective modules in the living body detection system according to an embodiment of the present disclosure may be implemented by that the processor in the living body detection system according to an embodiment of the present disclosure run the computer program instructions stored in the memory, or may be implemented by that the computer program instructions stored in the computer-readable storage medium of the computer program product according to an embodiment of the present disclosure are run by a computer.

The computer-readable storage medium may be any combination of one or more computer-readable storage mediums, e.g., a computer-readable storage medium containing computer-readable program codes for randomly generating action instruction sequences, another computer-readable storage medium containing computer-readable program codes for carrying out authentication on face activities.

The computer-readable storage medium may for example include a memory card of a smart phone, a storage unit of a tablet computer, a hard disk of a personal computer, a random access memory (RAM), a read only memory (ROM), an erasable programmable read-only memory (EPROM), a portable compact disc read-only memory (CD-ROM), a USB memory, or a combination of any the aforesaid storage mediums.

Exemplary embodiments of the present disclosure as described in detail in the above are merely illustrative, rather than limitative. However, those skilled in the art should understand that, various modifications, combinations or sub-combinations may be made to these embodiments without departing from the principles and spirits of the present disclosure, and such modifications are intended to fall within the scope of the present disclosure.

What is claimed is:

1. A living body detection method, comprising:
    using a laser light source to irradiate a human face of an object to be detected;
    capturing an image of the human face of the object to be detected that is irradiated by the laser light source;
    calculating a light spot area of the image of the human face of the object to be detected;
    comparing the light spot area with a first predetermined area threshold; and
    determining that the object to be detected is a living body if the light spot area is greater than the first predetermined area threshold,
    wherein said calculating a light spot area of the image of the human face of the object to be detected comprises:
        acquiring image matrix data of the image of the human face of the object to be detected;
        performing binarization conversion on the image matrix data based on a first predetermined grayscale threshold to convert pixel dots having a grayscale value larger than or equal to the first predetermined grayscale threshold among the image matrix data into pixel dots of a first type having a first grayscale value, and to convert pixel dots having a grayscale value smaller than the first predetermined grayscale threshold among the image matrix data into pixel dots of a second type having a second grayscale value, thereby obtaining first binarized image matrix data, the first grayscale value being larger than the second grayscale value;
        determining a maximum number of interconnected pixel dots of the first type from among the first binarized image matrix data; and
        calculating an area corresponding to the maximum number of interconnected pixel dots of the first type as the light spot area, and
    wherein the living body detection method further comprises:
        performing binarization conversion on the image matrix data based on a second predetermined grayscale threshold to convert pixel dots having a grayscale value larger than or equal to the second predetermined grayscale threshold among the image matrix data into pixel dots of a first type having a first grayscale value, and convert pixel dots having a grayscale value smaller than the second predetermined grayscale threshold among the image matrix data into pixel dots of a second type having a second grayscale value, thereby obtaining second binarized image matrix data; and
        stopping irradiation if the number of pixel dots of the first type among the second binarized image matrix data exceeds a first predetermined number threshold.

2. The living body detection method as claimed in claim 1, wherein the laser light source is a light source that generates a dot-shaped light spot, and positions of the laser light source and the object to be detected are fixed.

3. The living body detection method as claimed in claim 1, wherein the laser light source is a light source that generates a plurality of dot-shaped light spots, and positions of the laser light source and the object to be detected change, and said capturing an image of the human face of the object to be detected that is irradiated by the laser light source comprises:
  capturing an image of the human face of the object to be detected that is irradiated by the laser light source, and determining a regional image corresponding to a predetermined region of the object to be detected in said image as an image of the human face of the object to be detected.

4. The living body detection method as claimed in claim 1, wherein the laser light source is a laser light source capable of adjusting a light emission direction, and positions of the laser light source and the object to be detected change, and said acquiring image matrix data of the image of the human face of the object to be detected comprises:
  acquiring preliminary image matrix data of the human face of the object to be detected that is irradiated by the laser light source;
  performing binarization conversion on the preliminary image matrix data based on a first predetermined grayscale threshold to convert pixel dots having a grayscale value larger than or equal to the first predetermined grayscale threshold among the preliminary image matrix data into pixel dots of a first type having a first grayscale value, and convert pixel dots having a grayscale value smaller than the first predetermined grayscale threshold among the preliminary image matrix data into pixel dots of a second type having a second grayscale value, thereby obtaining binarized preliminary image matrix data;
  determining a maximum number of interconnected pixel dots of the first type from among the binarized preliminary image matrix data, and calculating a first center-of-gravity position corresponding to the maximum number of interconnected pixel dots of the first type;
  determining a second center-of-gravity position corresponding to a predetermined region on the human face of the object to be detected in a preliminary image; and
  adjusting a light emission direction of light irradiated by the laser light source to cause the first center-of-gravity position and the second center-of-gravity position to coincide with each other, thereby obtaining image matrix data of the image of the human face of the object to be detected that is irradiated by the laser light source whose light emission direction has been adjusted.

5. The living body detection method as claimed in claim 2, further comprising:
  performing binarization conversion on the image matrix data based on a third predetermined grayscale threshold to convert pixel dots having a grayscale value larger than or equal to the third predetermined grayscale threshold among the image matrix data into pixel dots of a first type having a first grayscale value, and convert pixel dots having a grayscale value smaller than the third predetermined grayscale threshold among the image matrix data into pixel dots of a second type having a second grayscale value, thereby obtaining third binarized image matrix data;
  calculating a third center-of-gravity position corresponding to pixel dots of the first type among the third binarized image matrix data; and
  stopping irradiation if the third center-of-gravity position is outside a predetermined first range threshold.

6. The living body detection method as claimed in claim 2, further comprising:
  determining a predetermined pixel dot region corresponding to a predetermined region on the human face of the object to be detected from among the image matrix data;
  calculating a first center-of-gravity position corresponding to a maximum number of interconnected pixel dots of the first type; and
  stopping irradiation if the first center-of-gravity position is within the predetermined pixel dot region.

7. The living body detection method as claimed in claim 3, further comprising:
  comparing the light spot area with a second predetermined area threshold, and stopping irradiation if the light spot area is greater than the second predetermined area threshold.

8. The living body detection method as claimed in claim 3, further comprising:
  determining a predetermined pixel dot corresponding to a predetermined point on the human face of the object to be detected among the image matrix data;
  calculating a first center-of-gravity position corresponding to a maximum number of interconnected pixel dots of the first type; and
  calculating a distance between the first center-of-gravity position and the predetermined pixel dot, and stopping irradiation if the distance is smaller than a predetermined distance threshold.

9. The living body detection method as claimed in claim 4, further comprising:
  calculating a plurality of light spot areas corresponding to interconnected pixel dots of the first type; and
  stopping irradiation if one of the plurality of light spot areas is greater than a second predetermined area threshold or each of the plurality of spot areas is smaller than a third predetermined area threshold.

10. A living body detection system, comprising:
  a laser light source unit configured to emit irradiation light to irradiate a human face of an object to be detected;
  an image capturing unit configured to capture an image of the human face of the object to be detected that is irradiated by the laser light source unit; and
  a living body detection unit configured to determine whether the object to be detected is a living body, wherein the living body detection unit:
    calculates a light spot area of the image of the human face of the object to be detected,
    compares the light spot area with a first predetermined area threshold, and
    determines that the object to be detected is a living body if the light spot area is greater than the first predetermined area threshold,
  wherein the living body detection unit acquires image matrix data of the image of the human face of the object to be detected;
  the living body detection unit performs binarization conversion on the image matrix data based on a first predetermined grayscale threshold to convert pixel dots having a grayscale value larger than or equal to the first predetermined grayscale threshold among the image matrix data into pixel dots of a first type having a first grayscale value, and convert pixel dots having a grayscale value smaller than the first predetermined grayscale threshold among the image matrix data into pixel dots of a second type having a second grayscale value, thereby obtaining first binarized image matrix data, the first grayscale value being larger than the second grayscale value; and the living body detection unit:
  determines a maximum number of interconnected pixel dots of the first type from among the first binarized image matrix data, and
  calculates an area corresponding to the maximum number of interconnected pixel dots of the first type as the light spot area
wherein the living body detection unit is further configured to:
  perform binarization conversion on the image matrix data based on a second predetermined threshold to convert pixel dots having a grayscale value larger than or equal to the second predetermined grayscale threshold among the image matrix data into pixel dots of a first type having a first grayscale value, and convert pixel dots having a grayscale value smaller than the second predetermined grayscale threshold among the image matrix data into pixel dots of a second type having a second grayscale value, thereby obtaining second binarized image matrix data; and
  control the laser light source unit to stop irradiation if the number of pixel dots of the first type among the second binarized image matrix data exceeds a first predetermined number threshold.

11. The living body detection system as claimed in claim 10, wherein the laser light source unit is a light source unit that generates a dot-shaped light spot, and positions of the laser light source unit and the object to be detected are fixed.

12. The living body detection system as claimed in claim 10, wherein the laser light source unit is a light source unit that generates a plurality of dot-shaped light spots, and positions of the laser light source unit and the object to be detected change;
  the image capturing unit captures an image of the human face of the object to be detected that is irradiated by the laser light source unit; and
  the living body detection unit determines a regional image corresponding to a predetermined region of the object to be detected in the image as an image of the human face of the object to be detected.

13. The living body detection system as claimed in claim 10, wherein
  the laser light source unit is a laser light source capable of adjusting a light emission direction, and positions of the laser light source unit and the object to be detected change;
  the living body detection unit acquires preliminary image matrix data of the human face of the object to be detected that is irradiated by the laser light source unit;
  the living body detection unit performs binarization conversion on the preliminary image matrix data based on a first predetermined grayscale threshold to convert pixel dots having a grayscale value larger than or equal to the first predetermined grayscale threshold among the preliminary image matrix data into pixel dots of a first type having a first grayscale value, and convert pixel dots having a grayscale value smaller than the first predetermined grayscale threshold among the preliminary image matrix data into pixel dots of a second type having a second grayscale value, thereby obtaining binarized preliminary image matrix data; the living body detection unit determines a maximum number of interconnected pixel dots of the first type from among the binarized preliminary image matrix data, and calculates a first center-of-gravity position corresponding to the maximum number of interconnected pixel dots of the first type; the living body detection unit determines a second center-of-gravity position corresponding to a predetermined region on the human face of the object to be detected in a preliminary image; and
  the living body detection unit controls the laser light source unit to adjust a light emission direction to cause the first center-of-gravity position and the second center-of-gravity position to coincide with each other, thereby obtaining image matrix data of the image of the human face of the object to be detected that is irradiated by the laser light source unit whose light emission direction has been adjusted.

14. The living body detection system as claimed in claim 11, wherein the living body detection unit is further configured to:
  perform binarization conversion on the image matrix data based on a third predetermined grayscale threshold to convert pixel dots having a grayscale value larger than or equal to the third predetermined grayscale threshold among the image matrix data into pixel dots of a first type having a first grayscale value, and convert pixel dots having a grayscale value smaller than the third predetermined grayscale threshold among the image matrix data into pixel dots of a second type having a second grayscale value, thereby obtaining third binarized image matrix data;
  calculate a third center-of-gravity position corresponding to pixel dots of the first type among the third binarized image matrix data; and
  control the laser light source unit to stop irradiation if the third center-of-gravity position is outside a predetermined first range threshold.

15. The living body detection system as claimed in claim 11, wherein the living body detection unit is further configured to:
  determine a predetermined pixel dot region corresponding to a predetermined region on the human face of the object to be detected from among the image matrix data;
  calculate a first center-of-gravity position corresponding to a maximum number of interconnected pixel dots of the first type; and
  control the laser light source unit to stop irradiation if the first center-of-gravity position is within the predetermined pixel dot region.

16. The living body detection system as claimed in claim 12, wherein the living body detection unit is further configured to:
  compare the light spot area with a second predetermined area threshold, and control the laser light source unit to stop irradiation if the light spot area is greater than the second predetermined area threshold.

17. The living body detection system as claimed in claim 12, wherein the living body detection unit is further configured to:
  determine a predetermined pixel dot corresponding to a predetermined point on the human face of the object to be detected among the image matrix data;
  calculate a first center-of-gravity position corresponding to a maximum number of interconnected pixel dots of the first type; and
  calculate a distance between the first center-of-gravity position and the predetermined pixel dot, and control the laser light source unit to stop irradiation if the distance is smaller than a predetermined distance threshold.

18. The living body detection system as claimed in claim 13, wherein the living body detection unit is further configured to:

calculate a plurality of light spot areas corresponding to interconnected pixel dots of the first type; and control the laser light source unit to stop irradiation if one of the plurality of light spot areas is greater than a second predetermined area threshold or each of the plurality of spot areas is smaller than a third predetermined area threshold.

19. A non-transitory computer-readable medium on which computer program instructions configured to execute the following steps when being run by a computer are stored:

capturing an image of a human face of an object to be detected that is irradiated by a laser light source;

calculating a light spot area of the image of the human face of the object to be detected; and comparing the light spot area with a first predetermined area threshold, and determining that the object to be detected is a living body if the light spot area is greater than the first predetermined area threshold, wherein said calculating a light spot area of the image of the human face of the object to be detected comprises:

acquiring image matrix data of the image of the human face of the object to be detected;

performing binarization conversion on the image matrix data based on a first predetermined grayscale threshold to convert pixel dots having a grayscale value larger than or equal to the first predetermined grayscale threshold among the image matrix data into pixel dots of a first type having a first grayscale value, and convert pixel dots having a grayscale value smaller than the first predetermined grayscale threshold among the image matrix data into pixel dots of a second type having a second grayscale value, thereby obtaining first binarized image matrix data, the first grayscale value being larger than the second grayscale value; and determining a maximum number of interconnected pixel dots of the first type from among the first binarized image matrix data and calculating an area corresponding to the maximum number of interconnected pixel dots of the first type as the light spot area, wherein the computer program instructions further configured to:

perform binarization conversion on the image matrix data based on a second predetermined threshold to convert pixel dots having a grayscale value larger than or equal to the second predetermined grayscale threshold among the image matrix data into pixel dots of a first type having a first grayscale value, and convert pixel dots having a grayscale value smaller than the second predetermined grayscale threshold among the image matrix data into pixel dots of a second type having a second grayscale value, thereby obtaining second binarized image matrix data; and control the laser light source unit to stop irradiation if the number of pixel dots of the first type among the second binarized image matrix data exceeds a first predetermined number threshold.

\* \* \* \* \*